G. B. HALSTED.

Damper.

No. 70,836.

Patented Nov. 12, 1867.

WITNESSES

J. W. Coombs.
G. W. Reed

INVENTOR:

Griffen B. Halsted

United States Patent Office.

GRIFFEN B. HALSTED, OF NEW YORK, N. Y.

Letters Patent No. 70,836, dated November 12, 1867.

---

STOVE-PIPE DAMPER.

---

*The Schedule referred to in these Letters Patent and making part of the same.*

---

TO ALL WHOM IT MAY CONCERN:

Be it known that I, GRIFFEN B. HALSTED, of the city, county, and State of New York, have invented a new and useful Improvement in Dampers for Stoves, &c.; and I do hereby declare that the following is a full, clear, and exact description of the same, reference being had to the accompanying drawings, making a portion of this specification, in which—

Similar letters of reference indicate corresponding parts in all the figures.

The object of this invention is to provide an efficient means whereby the elasticity of the stove pipe may be employed to hold the damper in any desired position; and it consists in a notched friction-ring, in combination with a lateral spur formed upon one end of the damper-shaft, whereby the desired result is secured.

The invention further consists in constructing the aforesaid friction-ring of a cam-like shape, in such manner that by turning the same with reference to the damper-shaft, it may be adjusted to compress the pipe to a greater or less degree, in order to increase or decrease the friction exerted by the pipe upon the aforesaid damper-shaft, and thus effectually insure the requisite retention of the damper in the position required.

The invention further consists in a novel means, whereby the aforesaid spurred damper-shaft may be fitted into the damper without involving any increased expenditure of time or labor as compared with that required in fitting the ordinary damper to its shaft.

To enable others to understand the nature and construction of my invention, I will proceed to describe it with reference to the drawings.

Figure 1:
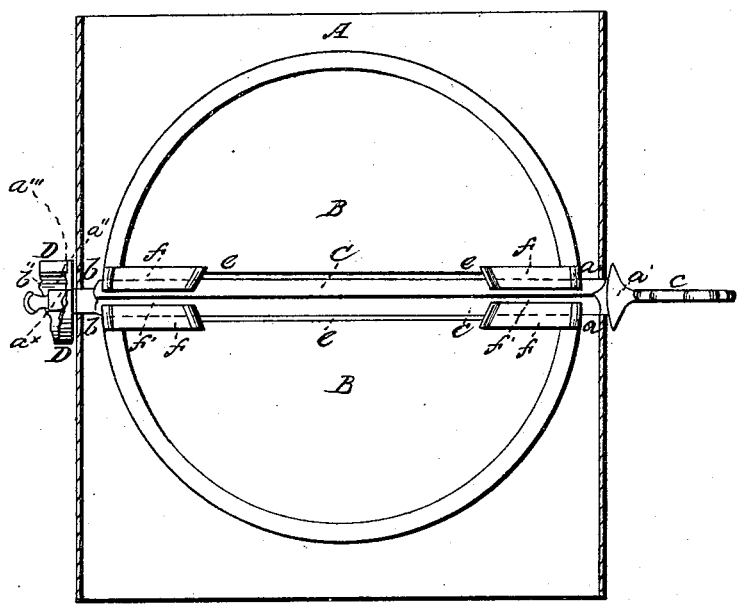
Figure 1 is a vertical transverse section of a stove pipe fitted with a damper made according to my invention.
Figure 2:
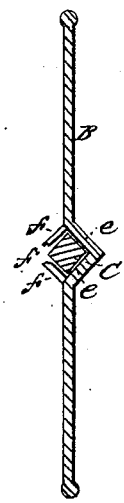
Figure 2 is a detached sectional view of such damper.
Figure 3:
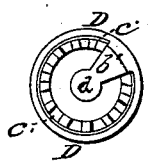
Figures 3 and 4 are detached end views of a portion of the invention.
Figure 4:
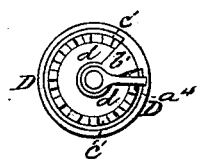

A represents the stove pipe, which may be of any ordinary or suitable form, and within which is placed the butterfly-valve or damper B, secured upon the shaft C, the ends of which work in bearings formed by holes of appropriate form provided in the opposite sides of the pipe A, as shown at $a\ b$. One end of the damper-shaft C is provided with a knob or handle, $c$, whereby it may be turned upon its horizontal axis when required to adjust the damper. The inner portion $a'$ of this knob $c$ is enlarged in such manner that its annular inner surface will constitute a friction bearing, which rests in contact with the side of the pipe, as shown in fig. 1, and the purpose of which will presently hereinafter appear. The opposite end of the damper-shaft C is furnished with a space, $a^*$, situated at right angles to the said shaft, as represented more clearly in fig. 4. D indicates a friction-ring, the central opening $d$ of which is recessed at one side, as shown at $b'$, to permit the passage through it of the spur $a^*$ of the damper-shaft, as herein presently fully set forth. Formed around the greater portion of the circumference of this friction-ring, upon the outer side thereof, is a rim, $c'$, which gives the cam-like form to the ring D, the outer surface of the said rim gradually increasing its distance from the base of the ring, from the point $a''$ to the point $b''$, as shown more fully in fig. 1. The aforesaid rim $c'$ is furthermore notched or indented throughout its entire length, as represented in figs. 1, 3, and 4. The damper, with its shaft C, being in position, as hereinbefore set forth, the cam-shaped ring D just described is placed upon the spurred extremity of the damper-shaft, the recess $b'$ allowing the spur $a^*$ of the said shaft to be passed through the aforesaid ring, which being done, the latter is partially turned around to bring the spur $a^*$ upon the rim $c'$ of the same. The pipe A being clamped as it were between the inner friction surface of the part $a'$ of the knob $c$, and the corresponding inner surface of the cam-shaped friction-ring, the pipe may, within certain limits, be compressed to any desired degree by placing the spur $a^*$ of the damper-shaft upon a more or less elevated part of the rim $c'$ of the said ring. The elasticity of the pipe thus compressed causing the same to press against the inner surfaces of the ring D and knob $c$, the friction between the said surfaces and the sides of the pipe securely holds the shaft C, and consequently the damper B, in any position to which it may be turned, by means of the knob or handle $c$ of the shaft, as hereinbefore mentioned, the spur fitting into one of the notches or indentations of the rim $c'$ of the friction-ring D, in such manner as to cause the ring to turn with the shaft, and be thus retained in proper position with reference thereto. The central portion of the damper D is formed with a transverse angular groove, $e$, at each end of which are two lips, $f$, the position of which is represented in figs. 1 and 2, one side of the central portion of the damper-shaft resting in the groove $e$, and being held thereon by the overlapping of the lips $f$ upon the opposite side of the same, the shaft being brought into this position by thrusting it longitudinally underneath the aforesaid lips $f$, the spaces $f'$ between the lips allowing the passage of the spur $a^*$, so that by these means the damper may be attached to its shaft without any difficulty or waste of time.

I do not claim broadly retaining the damper in position by means of the elasticity of the pipe, as that has been done before; but what I claim as my invention, and desire to secure by Letters Patent, is—

1. The notched friction-ring, in combination with the spurred shaft of the damper, substantially as and for the purpose specified.

2. The friction-ring constructed with a cam-like surface, whereby the compression of the pipe may be increased by turning the friction-ring with reference to the damper-shaft, substantially as and for the purpose specified.

3. The damper B, constructed with the angular groove $e$, and the lips $f$ arranged in relation with each other, substantially as described, whereby the damper may be readily attached to its spurred shaft, as set forth.

GRIFFEN B. HALSTED.

Witnesses:
J. W. COOMBS,
G. W. REED.